United States Patent
Kohori et al.

(10) Patent No.: US 10,538,210 B2
(45) Date of Patent: Jan. 21, 2020

(54) MULTI-CORE CABLE FOR VEHICLE

(71) Applicant: SUMITOMO ELECTRIC INDUSTRIES, LTD., Osaka-shi, Osaka (JP)

(72) Inventors: Takaya Kohori, Kanuma (JP); Hiroyuki Okawa, Kanuma (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/748,859

(22) PCT Filed: Jun. 2, 2017

(86) PCT No.: PCT/JP2017/020711
§ 371 (c)(1),
(2) Date: Jan. 30, 2018

(87) PCT Pub. No.: WO2017/209299
PCT Pub. Date: Dec. 7, 2017

(65) Prior Publication Data
US 2019/0077341 A1 Mar. 14, 2019

(30) Foreign Application Priority Data
Jun. 2, 2016 (JP) .................. 2016-111147

(51) Int. Cl.
*B60R 16/02* (2006.01)
*H01B 1/02* (2006.01)
(Continued)

(52) U.S. Cl.
CPC ......... *B60R 16/0207* (2013.01); *H01B 1/026* (2013.01); *H01B 9/003* (2013.01); *H01B 11/02* (2013.01); *H01B 13/0207* (2013.01)

(58) Field of Classification Search
CPC .... B60R 16/0207; H01B 1/026; H01B 9/003; H01B 11/02; H01B 13/0207; H01B 13/02
(Continued)

(56) References Cited

U.S. PATENT DOCUMENTS

2012/0061122 A1  3/2012  Kodama et al.

FOREIGN PATENT DOCUMENTS

JP    2006-351322 A    12/2006
JP    2011-1566 A       1/2011
(Continued)

OTHER PUBLICATIONS

Office Action dated Nov. 18, 2019 that issued in U.S. Appl. No. 16/574,301.

*Primary Examiner* — Tremesha S Willis
(74) *Attorney, Agent, or Firm* — Drinker Biddle & Reath LLP

(57) ABSTRACT

A multi-core cable for vehicle includes two power wires, two signal wires, two electric wires, and a sheath. The two power wires have the same size and are made of the same material. The two signal wires have the same size and are made of the same material, and a pair of the two signal wires is twisted and is configured a twisted pair of signal wires. The two electric wires have the same size and are made of the same material, and a pair of the electric wires is twisted and is configured as a twisted pair of electric wires. The two power wires, the twisted pair of signal wires and the twisted pair of electric wires are stranded.

11 Claims, 2 Drawing Sheets

(51) Int. Cl.
  *H01B 9/00* (2006.01)
  *H01B 11/02* (2006.01)
  *H01B 13/02* (2006.01)

(58) Field of Classification Search
  USPC ..................................................... 174/126.1
  See application file for complete search history.

(56) References Cited

FOREIGN PATENT DOCUMENTS

| | | |
|---|---|---|
| JP | 2013-122825 A | 6/2013 |
| JP | 2014-220043 A | 11/2014 |
| JP | 2015-72787 A | 4/2015 |
| WO | WO-2014/135615 A1 | 9/2014 |

MULTI-CORE CABLE FOR VEHICLE

TECHNICAL FIELD

The present invention relates to a multi-core cable for vehicle.

The present application claims priority from Japanese Patent Application No. 2016-111147 filed on Jun. 2, 2016, the entire content of which is incorporated herein by reference.

RELATED ART

Patent Document 1 discloses a cable in which a cable for feeding power to an electric parking brake of a vehicle and a cable for connecting a wheel speed sensor to an ECU (Electric Control Unit) are integrated.

CITATION LIST

Patent Documents

Patent Document 1: JP-A-2014-220043

SUMMARY OF THE INVENTION

A multi-core cable for vehicle in accordance with an aspect of the disclosure includes:

two power wires each of which includes a first conductor and a first insulating layer covering the first conductor, two signal wires each of which includes a second conductor thinner than the first conductor and a second insulating layer covering the second conductor, two electric wires each of which includes a third conductor thinner than the first conductor and a third insulating layer covering the third conductor, and a sheath covering the two power wires, the two signal wires and the two electric wires, wherein the two power wires have the same size and are made of the same material, wherein the two signal wires have the same size and are made of the same material, and a pair of the signal wires is twisted and is configured as a twisted pair of signal wires, wherein the two electric wires have the same size and are made of the same material, and a pair of the electric wires is twisted and is configured as a twisted pair of electric wires, and wherein the two power wires, the twisted pair of signal wires and the twisted pair of electric wires are stranded.

DETAILED DESCRIPTION OF EMBODIMENTS

[Problems to be Solved by Disclosure]

Figure 1:
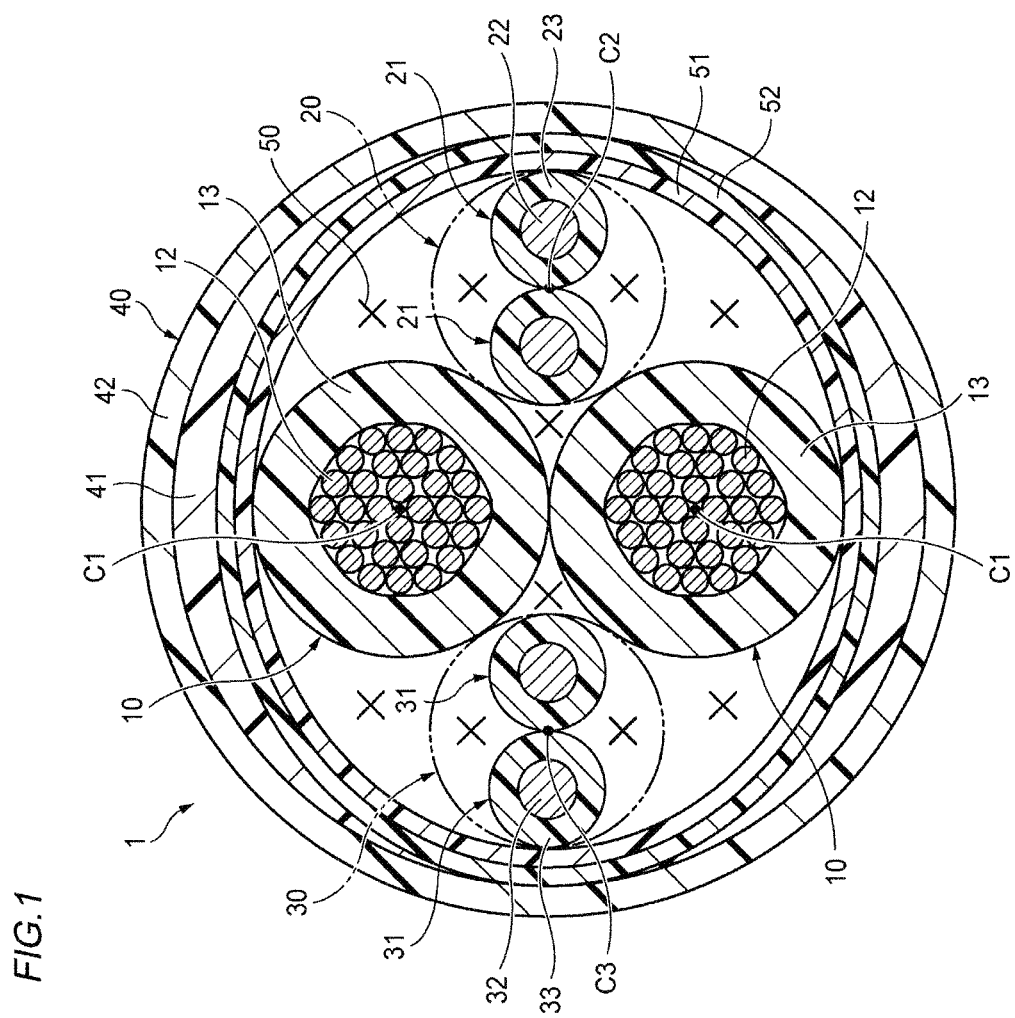
FIG. 1 is a sectional view depicting a multi-core cable for vehicle in accordance with a first embodiment of the present invention.

The disclosure is to provide a cable having six or more wires and capable of being easily secured to a vehicle.

[Effects of Disclosure]

According to the disclosure, a cable having six or more wires and capable of being easily secured to a vehicle is provided.

<Outline of Embodiments of Present Invention>

First, an outline of embodiments of the present invention is described.

(1) A multi-core cable for vehicle comprises:

two power wires each of which comprises a first conductor and a first insulating layer covering the first conductor;

two signal wires each of which comprises a second conductor thinner than the first conductor and a second insulating layer covering the second conductor;

two electric wires each of which comprises a third conductor thinner than the first conductor and a third insulating layer covering the third conductor; and a sheath covering the two power wires, the two signal wires and the two electric wires, wherein the two power wires have the same size and are made of the same material, wherein the two signal wires have the same size and are made of the same material, and a pair of the signal wires is twisted and is configured as a twisted pair of signal wires, wherein the two electric wires have the same size and are made of the same material, and a pair of the electric wires is twisted and is configured as a twisted pair of electric wires, and wherein the two power wires, the twisted pair of signal wires and the twisted pair of electric wires are stranded.

According to the multi-core cable for vehicle having the above configuration, it is possible to arrange the two power wires, the twisted pair of signal wires and the twisted pair of electric wires at one time, so that the arranging man-hour is reduced, as compared to a configuration of separately arranging the same. Also, as compared to a configuration of separately arranging the two power wires, the twisted pair of signal wires and the twisted pair of electric wires, a space required for the arranging is reduced.

Also, the multi-core cable includes at least the two power wires, one twisted pair of signal wires and one twisted pair of electric wires. For this reason, the wires can be easily disposed in a balanced manner on a section perpendicular to a longitudinal direction of the multi-core cable, and an outer shape of the cable including the sheath is likely to be close to a circular shape. For this reason, a gap is difficult to be formed at a crimped part of the sheath and a water stop member, so that the excellent water stop ability is obtained.

For the above reasons, a cable having six or more wires and capable of being easily secured to a vehicle is provided.

(2) In the multi-core cable for vehicle according to (1), an outer diameter of the power wire may be 75% to 135% of an outer diameter of the twisted pair of signal wires.

According to the multi-core cable for vehicle having the above configuration, the sizes of the two power wires and the twisted pair of signal wires are substantially equal to each other. Therefore, when the wires are stranded, a cable shape including the sheath is close to a true circle shape, so that the excellent water stop ability is obtained.

(3) In the multi-core cable for vehicle according to (1) or (2), on a section perpendicular to a longitudinal direction of the multi-core cable, centers of the two power wires, a center of the twisted pair of signal wires, and a center of the twisted pair of electric wires are positioned at apexes of a hypothetical quadrangle, and the two power wires may be provided at diagonal positions.

According to the multi-core cable for vehicle having the above configuration, a shape obtained by stranding the two power wires, the twisted pair of signal wires and the twisted pair of electric wires is stable, and a cross-sectional shape of the multi-core cable can be easily made constant in the longitudinal direction. For this reason, when bending the multi-core cable, the force to be applied to the bending direction of the two power wires, the twisted pair of signal wires and the twisted pair of electric wires is balanced, the load to be applied to the power wires is reduced, and the power wires are difficult to break.

(4) In the multi-core cable for vehicle according to one of (1) to (3), the first conductor may include a plurality of conductor wires, and on a section perpendicular to a longitudinal direction of the power wire, a gap area S3(=S1−S2) obtained by subtracting a total sum S2 of cross-sectional areas of the conductor wires from an area S1 of a part surrounded by the first insulating layer may be 5% to 20% of the area S1 of the part surrounded by the first insulating layer. Hereinafter, S3/S1 is referred to as 'gap ratio'.

According to the multi-core cable for vehicle having the above configuration, since the power wire has the gap area of an appropriate magnitude, it has a drawing force of an appropriate magnitude and the excellent bending resistance.

(5) In the multi-core cable for vehicle according to one of (1) to (4), the two power wires may be disposed with a gap, and the gap may be filled with fiber.

According to the multi-core cable for vehicle having the above configuration, it is possible to increase the bending resistance of the multi-core cable.

(6) The multi-core cable for vehicle according to one of (1) to (5), may further comprise:

a second twisted pair of electric wires configured by twisting a pair of electric wires having the same size and material, each of the electric wires comprising a fourth conductor thinner than the first conductor and a fourth insulating layer covering the fourth conductor; and a third twisted pair of electric wires configured by twisting a pair of electric wires having the same size and material, each of the electric wires comprising a fifth conductor thinner than the first conductor and a fifth insulating layer covering the fifth conductor, wherein the two power wires, the twisted pair of signal wires, the twisted pair of electric wires, the second twisted pair of electric wires and the third twisted pair of electric wires are stranded and covered with the sheath.

The multi-core cable of the above configuration has the second twisted pair of electric wires and the third twisted pair of electric wires, in addition to the power wires, the twisted pair of signal wires, and the twisted pair of electric wires. For this reason, it is possible to arrange the wires at one time and to reduce the arranging man-hour, as compared to a configuration of separately arranging the same. Also, as compared to a configuration of separately arranging the wires, a space required for the arranging is reduced.

Also, the wires are disposed in a balanced manner on the section perpendicular to the longitudinal direction of the multi-core cable, and an outer shape of the cable including the sheath is likely to be close to a circular shape. For this reason, a gap is difficult to be formed at a crimped part of the sheath and the water stop member, so that the excellent water stop ability is obtained.

<Details of Embodiments of Present Invention>

In the below, embodiments of the multi-core cable of the present invention will be described in detail with reference to the drawings.

In the meantime, the present invention is not limited to the embodiments, is defined in the claims, and includes all changes made within the meaning and scope equivalent to the claims.

First Embodiment

A multi-core cable 1 is used so as to connect an electric control unit (ECU (Electric Control Unit)) mounted on a vehicle and an electric brake, an electric parking brake, a wheel speed sensor and the like provided around a wheel, for example. The wheel is displaceably supported to a vehicle body via a suspension device and a steering device. In the first embodiment, the multi-core cable 1 is used so as to connect the ECU fixed to the vehicle body and a component that is mounted to the wheel displaceably supported to the vehicle body.

The multi-core cable 1 is required to be arranged in a small space in a tire house in which the wheel is to be accommodated, and to be easily bendable so as not to interfere with displacement of the wheel, and to have high durability against the bending to be repeatedly applied thereto.

FIG. 1 is a sectional view depicting the multi-core cable 1 in accordance with the first embodiment of the present invention. FIG. 1 depicts a section perpendicular to a longitudinal direction of the multi-core cable 1. As shown in FIG. 1, the multi-core cable 1 has two power wires 10, two signal wires 21, two electric wires 31, and a sheath 40. In the first embodiment, an outer diameter of the multi-core cable 1 may be set to 7 mm to 18 mm, preferably 7.5 mm to 13 mm.

(Power Wire)

The two power wires 10 include, respectively, a first conductor 12, and a first insulating layer 13 configured to cover the first conductor 12. The two power wires 10 have the same size and are made of the same material. The power wire is used for transmitting electricity.

The two power wires 10 can be used to connect the electric brake (including an electric parking brake) and the ECU. The electric brake has a motor configured to drive a brake caliper. For example, one power wire 10 is used as a power feeding wire configured to feed power to the motor and the other power wire 10 can be used as an earth wire of the motor.

The first conductor 12 is configured by stranding a plurality of conductors. The conductor is a wire made of copper or copper alloy. The conductor may be made of a material having predetermined conductivity and flexibility such as copper wire and copper alloy wire. A cross-sectional area of the first conductor 12 may be set to 1.5 $mm^2$ to 3 $mm^2$.

The first insulating layer 13 is formed of a flame-retardant polyolefin-based resin. The first insulating layer 13 may be formed of crosslinked flame-retardant polyethylene having a flame retardant mixed thereto. The material of the first insulating layer 13 is not limited to the flame-retardant polyolefin-based resin (EVA (ethylene-vinyl acetate copolymer), EEA (ethylene-ethyl acrylate copolymer), EMA (ethylene-methyl acrylate copolymer) and the like), and the other materials such as crosslinked fluorine-based resin can also be used. An outer diameter of the first insulating layer 13 may be set to 2 mm to 4 mm.

(Signal Wire)

The two signal wires 21 include, respectively, a second conductor 22 thinner than the first conductor 12 and a second insulating layer 23 configured to cover the second conductor 22. The two signal wires 21 to be twisted have the same size and are made of the same material. A pair of the signal wires 21 is twisted and is configured as a twisted pair 20 of signal wires. A twisting pitch of the twisted pair 20 of signal wires may be set to 10 to 15 times of a twist diameter of the twisted pair 20 of signal wires (an outer diameter of the twisted pair 20 of signal wires).

The outer diameter of the twisted pair 20 of signal wires may be set to be substantially the same as an outer diameter of the power wire 10. The outer diameter of the power wire 10 is preferably 75% to 135% of the outer diameter of the twisted pair 20 of signal wires. The outer diameter of the power wire 10 is more preferably 90% to 115% of the outer diameter of the twisted pair 20 of signal wires.

The signal wire 21 can be used to transmit a signal from a sensor or to transmit a control signal from the ECU. The two signal wires 21 can be used for wiring of an ABS (Anti-lock Brake System), for example. The two signal wires 21 can be respectively used as a wire for connecting a differential wheel speed sensor and an ECU of a vehicle, for example.

The second conductor 22 may be configured by one conductor, as shown, or may be configured by stranding a plurality of conductors, like the power wire 10. The second conductor 22 may be formed of a material, which is the same as or different from the conductor configuring the first conductor 12. A cross-sectional area of the second conductor 22 may be set to 0.13 mm$^2$ to 0.5 mm$^2$.

The second insulating layer 23 may be formed of a material, which is the same as or different from the first insulating layer 13. An outer diameter of the second insulating layer 23 may be set to 1.0 mm to 2.2 mm.

(Electric Wire)

The two electric wires 31 include, respectively, a third conductor 32 thinner than the first conductor 12 and a third insulating layer 33 configured to cover the third conductor 32. A pair of the two electric wires 31 is twisted and is configured as a twisted pair 30 of electric wires. The two electric wires 31 to be twisted have the same size and are formed of the same material. The size and material of the electric wire 31 may be the same as those of the signal wire 21. The twisted pair 30 of electric wires is preferably twisted in the same direction as the twisted pair 20 of signal wires. A twisting pitch of the twisted pair 30 of electric wires is preferably the same as the twisted pair 20 of signal wires. In the meantime, as shown in FIG. 1, when the wires 10, 21, 31 are stranded so as to sandwich the two power wires 10 by the signal wires 21 and the electric wires 31, the force by which the respective wires 10, 21, 31 are stranded are favorably balanced.

An outer diameter of the twisted pair 30 of electric wires may be set to be substantially the same as the outer diameter of the twisted pair 20 of signal wires. The outer diameter of the twisted pair 30 of electric wires may be set to be substantially the same as the outer diameter of the power wire 10. The outer diameter of the power wire 10 is preferably 75% to 135% of the outer diameter of the twisted pair 30 of electric wires. The outer diameter of the power wire 10 is more preferably 90% to 115% of the outer diameter of the twisted pair 30 of electric wires.

The electric wire 31 can be used to transmit a signal from a sensor and to transmit a control signal from the ECU, and can also be used as a power feeding wire for feeding power to an electronic device. The electric wire 31 can be used as a power feeding wire, a control wire and a sensor wire, which are to be used for a damper control system configured to change a hydraulic characteristic of the suspension. Alternatively, the electric wire 31 can be used for wiring of an in-vehicle network.

The third conductor 32 may be configured by one conductor, as shown, or may be configured by stranding a plurality of conductors, like the power wire 10. The third conductor 32 may be formed of a material, which is the same as or different from the conductor configuring the first conductor 12 or the second conductor 22. A cross-sectional area of the third conductor 32 may be set to 0.13 mm$^2$ to 0.5 mm$^2$.

The third insulating layer 33 may be formed of a material, which is the same as or different from the second insulating layer 23. An outer diameter of the third insulating layer 33 may be set to 1.0 mm to 2.2 mm.

(Sheath)

The sheath 40 is configured to cover all the wires including the two power wires 10, the two signal wires 21 and the two electric wires 31. The two power wires 10, one twisted pair 20 of signal wires and one twisted pair 30 of electric wires are stranded. The sheath 40 is configured to cover the two power wires 10, one twisted pair 20 of signal wires and one twisted pair 30 of electric wires stranded.

The sheath 40 includes an inner sheath 41 and an outer sheath 42 positioned at an outermore side than the inner sheath 41.

The inner sheath 41 is configured to keep a stranded shape of all the wires including the two power wires 10, the two signal wires 21 and the two electric wires 31. The inner sheath 41 is formed by extruding and coating the same on outer peripheries of the two power wires 10, the two signal wires 21 and the two electric wires 31. The inner sheath 41 may be formed of the same material as the outer sheath 42 or a resin different from the outer sheath 42. The inner sheath 41 may be formed of a polyolefin-based resin such as polyethylene and ethylene-vinyl acetate copolymer (EVA), polyurethane elastomer, polyester elastomer or a composition formed by mixing at least two thereof. The outer sheath 42 or the inner sheath 41 may be formed of crosslinked resin.

The outer sheath 42 is provided so as to protect all the wires including the two power wires 10, the two signal wires 21 and the two electric wires 31 from an outside. The outer sheath 42 is formed by extruding and coating the same on an outer periphery of the inner sheath 41. The outer sheath 42 may be formed of crosslinked/non-crosslinked thermoplastic polyurethane (TPU) having excellent abrasion resistance, for example. Due to the excellent heat resistance, the outer sheath 42 is preferably formed of crosslinked thermoplastic polyurethane.

An outer diameter of the sheath 40 may be set to 7.5 mm to 11 mm.

(Stranding Direction, Stranding Pitch)

The two power wires 10, the twisted pair 20 of signal wires, and the twisted pair 30 of electric wires are stranded. A strand diameter of all the stranded wires may be set to 5.5 mm to 9 mm.

An stranding pitch of all the wires including the two power wires 10, the twisted pair 20 of signal wires and the twisted pair 30 of electric wires may be set to 12 to 24 times of the strand diameter of all the wires including the two power wires 10, the twisted pair 20 of signal wires and the twisted pair 30 of electric wires. When the stranding pitch is less than 12 times of the strand diameter, the multi-core cable 1 is likely to break when twisting the same. Also, when the stranding pitch is greater than 24 times of the strand diameter, the power wire 10 is likely to break when bending the multi-core cable 1.

In the meantime, a ratio of the stranding pitch of all the wires including the two power wires 10, the twisted pair 20 of signal wires and the twisted pair 30 of electric wires to the strand diameter of all the wires is preferably greater than a ratio of the twisting pitch of the twisted pair 20 of signal wires to the twist diameter of the twisted pair 20 of signal wires. A stranding direction of all the wires is preferably opposite to a twisting direction of the twisted pair 20 of signal wires and the twisted pair 30 of electric wires.

(Filler)

The multi-core cable 1 may include a filler 50. The filler 50 is provided inside the sheath 40. The filler 50 may be configured by fiber such as spun rayon yarn and nylon yarn. The filler 50 may be configured by tensile strength fiber.

The filler 50 is provided in a gap formed by the two power wires 10. The filler 50 may also be provided between the power wire 10 and the signal wire 21, between the power wire 10 and the electric wire 31, between the two signal wires 21, and between the two electric wires 31, in addition to the gap between the two power wires 10.

For example, in order to easily form the cross-sectional shape of the multi-core cable 1 to a shape close to a true circle, the filler 50 is preferably provided inside the sheath 40. Alternatively, in order to increase the bendability of the multi-core cable 1, the filler 50 may be configured by the spun rayon yarn and nylon yarn having a buffer function.

(Wrapping Tape)

The multi-core cable 1 may have a wrapping tape 51. The wrapping tape 51 is configured to cover the two power wires 10, one twisted pair 20 of signal wires and one twisted pair 30 of electric wires. The wrapping tape 51 is configured to stably keep the stranded shape of the wires. The wrapping tape 51 is provided inside the sheath 40.

As the wrapping tape 51, a paper tape, a non-woven fabric tape, a resin tape such as polyester and the like can be used. Also, the wrapping tape 51 may be spirally wrapped or longitudinally wrapped onto the two power wires 10, one twisted pair 20 of signal wires and one twisted pair 30 of electric wires. Also, a wrapping direction may be a Z wrapping or S wrapping direction. Also, the wrapping direction may be the same direction as the pair twisting direction of the twisted pair 20 of signal wires and the twisted pair 30 of electric wires or may be an opposite direction thereto. The wrapping direction of the wrapping tape 51 and the pair twisting direction of the twisted pair 20 of signal wires and the twisted pair 30 of electric wires are preferably opposite to each other because an unevenness is difficult to occur on a surface of the wrapping tape 51 and the outer diameter shape of the multi-core cable 1 can be easily stable.

In the meantime, since the wrapping tape 51 has functions as the filler 50 having a buffer function and increasing the bendability and as the sheath 40 having a protection function from an outside, too, when the wrapping tape 51 is provided, it is possible to make the layers of the filler 50 and the sheath 40 thinner. Like this, when the wrapping tape 51 is provided, it is possible to provide the multi-core cable 1 that can be more easily bendable and has excellent abrasion resistance.

Also, when providing the sheath 40 of resin by the extrusion coating, the resin enters between the two power wires 10, so that it may be difficult to separate the two power wires 10 at a terminal of the multi-core cable 1. However, the wrapping tape 51 is provided, so that it is possible to prevent the resin from entering between the two power wires 10 and to easily take out the two power wires 10 from the terminal.

(Shield Layer)

The multi-core cable 1 may have a shield layer 52 for suppressing a noise to be emitted outside. The shield layer 52 may be configured by wrapping a metal tape onto the power wires 10, the twisted pair 20 of signal wires, the twisted pair 30 of electric wires. The shield layer 52 may also be configured by spirally wrapping a plurality of thin metal wires onto the wires. Alternatively, the shield layer 52 may also be configured by braiding the thin metal wires. The shield layer 52 may be provided outside the wrapping tape 51 and inside the sheath 40.

(Effects)

According to the multi-core cable for vehicle 1 of the first embodiment, it is possible to arrange the two power wires 10, the twisted pair 20 of signal wires, and the twisted pair 30 of electric wires at one time, and to reduce the arranging man-hour, as compared to a configuration of separately arranging the wires. Also, since the two power wires 10, the twisted pair 20 of signal wires, and the twisted pair 30 of electric wires are integrated as the single multi-core cable 1, a space required for the arranging is reduced, as compared to the configuration of separately arranging the two power wires 10, the twisted pair 20 of signal wires, the twisted pair 30 of electric wires.

Also, the multi-core cable 1 includes at least the two power wires 10, one twisted pair 20 of signal wires, and one twisted pair 30 of electric wires. For this reason, the corresponding wires are disposed in a balanced manner on the section perpendicular to the longitudinal direction of the multi-core cable 1, and an outer shape of the cable including the sheath 40 is likely to be close to a circular shape. For this reason, a gap is difficult to be formed at a crimped part of the sheath 40 and the water stop member, so that the excellent water stop ability is obtained. In contrast to the above configuration, when the cross-sectional shape of the sheath 40 is distorted from the true circle or the surface of the sheath 40 has a twisted wave, a gap is formed between the sheath 40 and the water stop member, so that the water stop ability may be deteriorated.

In the multi-core cable 1 of the above configuration, the outer diameter of the power wire 10 is preferably 75% to 135% of the outer diameter of the twisted pair 20 of signal wires. The outer diameter of the power wire 10 is more preferably 90% to 115% of the outer diameter of the paired stranded signal wire 20. In the meantime, the outer diameter of the power wire 10 means the outer diameter of the first insulating layer 13. The outer diameter of the twisted pair 20 of signal wires means a diameter of a hypothetical circumscribed circle on which the pair of signal wires 21 is circumscribed, and is two times of the signal wire 21.

According to the multi-core cable 1 of the first embodiment, since the sizes of the two power wires 10 and the twisted pair 20 of signal wires substantially coincide with each other, it is possible to easily maintain the twisted shape thereof, and to easily even the diameter of the multi-core cable 1 in the longitudinal direction.

Also, since the two power wires 10 and the twisted pair 20 of signal wires are disposed with a predetermined positional relation being maintained on the section perpendicular to the longitudinal direction of the multi-core cable 1, the cross-sectional shape after the twist is nearly inscribed on the circle. For this reason, it is possible to easily form the cross-sectional shape of the sheath 40 into a substantial true circle shape, and a gap is difficult to be formed between the sheath 40 and the water stop member, so that the water stop ability is further improved.

Also, more preferably, the sizes of the twisted pair 20 of signal wires and the twisted pair 30 of electric wires substantially coincide with each other.

As shown in FIG. 1, on the section perpendicular to the longitudinal direction of the multi-core cable 1, centers C1 of the two power wires 10, a center C2 of the twisted pair 20 of signal wires and a center C3 of the twisted pair 30 of electric wires are positioned at apexes of a hypothetical quadrangle, and the two power wires 10 are provided at diagonal positions of the quadrangle.

According to the multi-core cable 1 of the first embodiment, the stranded shape of the two power wires 10, the twisted pair 20 of signal wires and the twisted pair 30 of electric wires is stable, and the cross-sectional shape of the multi-core cable 1 can be easily made constant in the longitudinal direction.

Also, when bending the multi-core cable 1 more than once, the load is concentrated on the thickest wire, so that the thickest wire tends to break first. According to the multi-core cable 1 of the first embodiment, since the power wire 10 is thicker than the signal wire 21 and the electric wire 31, the power wire 10 tends to break earlier than the signal wire 21 and the electric wire 31. However, according to the multi-core cable 1 of the above configuration, the force that is applied in the bending direction of the power wires 10, the twisted pair 20 of signal wires and the twisted pair 30 of electric wires is balanced, so that the load to be applied to the thickest power wire 10 is reduced and the power wire 10 is difficult to break.

In the meantime, the hypothetical quadrangle is preferably a square. The twisted shape is more likely to be stable, and the load is difficult to be concentrated on the power wire 10 when bending the multi-core cable 1.

When the first conductor 12 is configured by a plurality of conductor wires, on the section perpendicular to the longitudinal direction of the power wire 10, a gap area S3(=S1−S2) obtained by subtracting a total sum S2 of cross-sectional areas of the conductor wires from an area S1 of a part surrounded by the first insulating layer 13 is preferably 5% to 20% of the area S1 of the part surrounded by the first insulating layer 13.

When the gap area S3 is less than 5%, the large bending stress is locally applied to the first conductor 12 upon the bending of the multi-core cable 1, so that the bending resistance may be deteriorated. When the gap area S3 is greater than 20%, the power wires 10 move excessively freely upon terminal processing of the multi-core cable 1, so that it may be difficult to perform the processing.

In the meantime, the gap area S3 may be obtained by image processing of binarizing a shade of a photograph of the section of the multi-core cable 1 into a conductor part and a gap part, specifying a part of the conductor wires of the first conductor 12 from the conductor part, and subtracting an area of the part of the conductor wires from an area of the part surrounded by the first insulating layer 13. For example, an image is made into two levels by software such as "Paint shop pro" (a product of Corel Company). A threshold is adjusted with naked eyes so that a conductor boundary is to be correctly distinguished, and the binarization is made with a histogram. By specifying the part of the conductor wires of the first conductor 12 with naked eyes, it is possible to obtain the total sum S2 of the cross-sectional areas of the conductor wires of the first conductor 12, the area S1 of the part surrounded by the first insulating layer 13, and the gap area S3.

Second Embodiment

Figure 2:
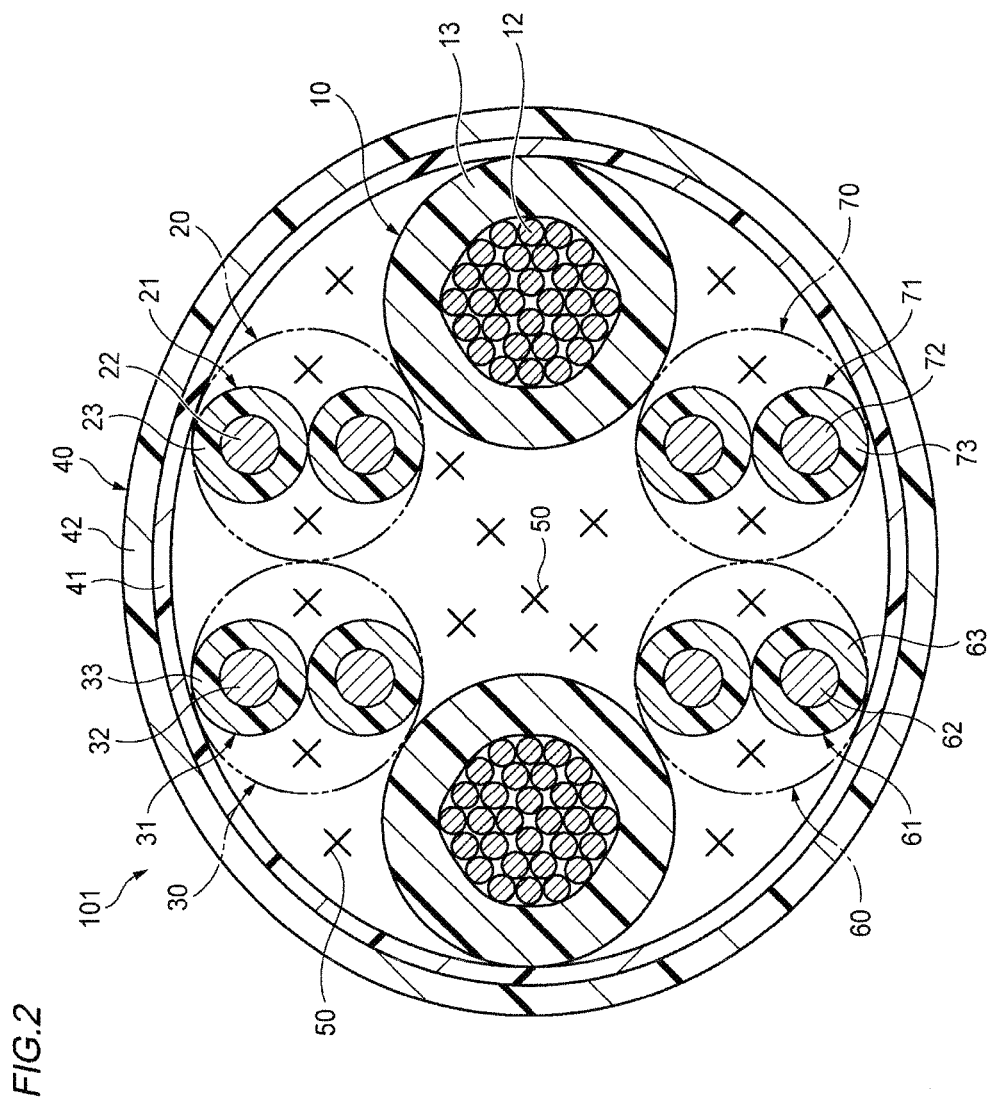
FIG. 2 is a sectional view depicting a multi-core cable for vehicle in accordance with a second embodiment of the present invention.

FIG. 2 is a sectional view depicting a multi-core cable for vehicle 101 in accordance with a second embodiment of the present invention.

In the first embodiment, the multi-core cable 1 having the two power wires 10, the two signal wires 21 and the two electric wires 31 has been described. However, the present invention is not limited thereto. For example, as shown in FIG. 2, a multi-core cable 101 may have four electric wires 61, 71, in addition to the two power wires 10, the two signal wires 21 and the two electric wires 31.

The multi-core cable 101 of the second embodiment includes the two power wires 10, one twisted pair 20 of signal wires configured by the two signal wires 21, one twisted pair 30 of electric wires configured by the two electric wires 31, one second twisted pair 60 of electric wires configured by the two electric wires 61, and one third twisted pair 70 of electric wires configured by the two electric wires 71. The two power wires 10, one twisted pair 20 of signal wires, one twisted pair 30 of electric wires, one second twisted pair 60 of electric wires, and one third twisted pair 70 of electric wires are stranded and are covered by the sheath 40.

The second twisted pair 60 of electric wires is configured by a pair of the electric wires 61 twisted and configured as a twisted pair of electric wires. The two electric wires 61 include, respectively, a fourth conductor 62 thinner than the first conductor 12 and a fourth insulating layer 63 configured to cover the fourth conductor 62. The two electric wires 61 have the same size and are made of the same material.

The third twisted pair 70 of electric wires is configured by a pair of the electric wires 71 twisted and configured as a twisted pair of electric wires. The two electric wires 71 include, respectively, a fifth conductor 72 thinner than the first conductor 12 and a fifth insulating layer 73 configured to cover the fifth conductor 72. The two electric wires 71 have the same size and are made of the same material.

The second twisted pair 60 of electric wires and the third twisted pair 70 of electric wires may be configured by the same material and size as the twisted pair 20 of signal wires.

The power wire 10, the twisted pair 20 of signal wires, the twisted pair 30 of electric wires are similar to those described in the first embodiment. The second twisted pair 60 of electric wires and the third twisted pair 70 of electric wires can be used for wiring of an in-vehicle network and wires connected to diverse sensors and devices and transmitting power and signals.

As shown in FIG. 2, the wrapping tape and the shield layer may not be provided. When providing the wrapping tape or the shield layer, the power wires 10, the twisted pair 20 of signal wires, the twisted pair 30 of electric wires, the second twisted pair 60 of electric wires, and the third twisted pair 70 of electric wires are stranded, like the multi-core cable 1 of FIG. 1, and then the wrapping tape or the shield layer is provided, and is covered with the sheath 40.

As shown in FIG. 2, on a section perpendicular to a longitudinal direction of the multi-core cable 101, the two power wires 10 are disposed with a gap, and the gap is preferably filled with the filler 50. Since the thick power wires 10 are not directly in contact with each other, the power wires 10 are difficult to break even when the multi-core cable is bent more than once.

Also, as shown in FIG. 2, on the section perpendicular to the longitudinal direction of the multi-core cable 101, the respective centers of the power wires 10, the twisted pair 20 of signal wires, the twisted pair 30 of electric wires, the second twisted pair 60 of electric wires, and the third twisted pair 70 of electric wires are preferably disposed on a circumference of a single circle. On the section, the power wires 10 are more preferably disposed at point-symmetric positions because it is possible to dispose the respective wires 20, 30, 60, 70 in a balanced manner. When the power wires 10 are disposed to be adjacent to each other, the other wires 20, 30, 60 70 do not intersect upon connection of the power wires 10 to the motor, so that it is possible to easily perform the connection.

EXAMPLE

In the below, the multi-core cable for vehicle (Example) of 10 wires configured as shown in Table 1 is described.

The conductor (first conductor) of the power wire was manufactured by stranding seven wires each of which was obtained by stranding 72 copper alloy wires having a diameter of 0.08 mm, and the cross-sectional area of the conductor was 2.5 mm². The first conductor was covered with crosslinked flame-retardant polyethylene (first insulating layer) so that the outer diameter became 3.0 mm. The two power wires are used for an electric parking brake.

The conductor (second conductor) of the twisted pair of signal wires was manufactured by stranding three wires each of which was obtained by stranding 16 copper alloy wires having a diameter of 0.08 mm, and the cross-sectional area of the conductor was 0.25 mm². The signal wire was obtained by covering the second conductor with crosslinked flame-retardant polyethylene (second insulating layer), and the outer diameter was 1.4 mm. The twisted pair of signal wires was obtained by twisting the two signal wires. The twisted pair of signal wires is used for ABS.

The third conductor and the fourth conductor had the same configuration as the second conductor. The electric wire including the third conductor and the electric wire including the fourth conductor had the same configuration as the above signal wire, and the twisted pair of electric wires and the second twisted pair of electric wires obtained by twisting the electric wires had the same configuration as the twisted pair of signal wires. The twisted pair of electric wires and the second twisted pair of electric wires are used for in-vehicle network.

The fifth conductor was manufactured by stranding seven wires each of which was obtained by stranding 15 copper alloy wires having a diameter of 0.08 mm, and the cross-sectional area of the conductor was 0.5 mm². The fifth conductor was covered with crosslinked flame-retardant polyethylene (fifth insulating layer), so that the electric wire having an outer diameter of 1.7 mm was obtained. The two electric wires were twisted to obtain the twisted third pair of electric wires. The third twisted pair of electric wires is used for damper control system.

The multi-core cable for vehicle was obtained by wrapping thin paper (a wrapping tape made of polyester) onto the two power wires, the twisted pair of signal wires, the twisted pair of electric wires, the second twisted pair of electric wires, and the third twisted pair of electric wires, providing the inner sheath (outer diameter: 10.8 mm) made of crosslinked polyethylene on an outer side of the thin paper, and covering an outer side of the inner sheath with the outer sheath (outer diameter: 12.0 mm) made of crosslinked flame-retardant polyurethane. The multi-core cable of Example is used to connect the ECU to an electric parking brake, a wheel speed sensor for ABS, an in-vehicle network device, and a device of a damper control system.

Comparative Example

The two power wires for electric parking brake, the twisted pair of signal wires for ABS, the twisted pair of electric wires and the second twisted pair of electric wires for in-vehicle network, and the third twisted pair of electric wires for damper control system were cabled by covering the same with the sheath, respectively, without twisting the wires, so that the six cables were obtained. In a cable group of Comparative Example, the power wires were connected to the electric parking brake and the ECU, the twisted pair of signal wires was connected to the wheel speed sensor and the ECU, the twisted pair of electric wires and the second twisted pair of electric wires were connected to the in-vehicle device and the ECU, and the third twisted pair of electric wires was connected to the damper control device and the ECU.

(Comparison of Example and Comparative Example)

Comparing the cases where the ECU and the diverse devices and the like were connected using the multi-core cable of Example and the cable group of Comparative Example, the space required for wiring of the multi-core cable relating to Example is smaller. Also, in the multi-core cable of Example, since the respective wires are integrated, it is possible to easily perform the wiring operation.

In particular, in the cable group of Comparative Example, it is necessary to protect the power wires, the twisted pair of signal wires, and the twisted pair of electric wires, respectively. For this reason, the sheath is required so as to protect the power wires, the twisted pair of signal wires, and the twisted pair of electric wires, respectively. Since the respective wires are covered with the sheath, a summed diameter of the cable group of Comparative Example is considerably greater than the diameter of the multi-core cable relating to Example.

(Repeated Bend Test)

The bending resistance of the multi-core cable was evaluated in accordance with the repeated bend test prescribed in ISO 14572:2011(E)5.9. In the repeated bend test, the multi-core cable was repeatedly applied with bending of −90° to +90°. When a reduction amount in resistance value of the power wire from an initial resistance value after the bending of 100,000 times was 5% or greater, it was determined that the power wire broke. When the reduction amount in resistance value of the power wire from the initial resistance value was smaller than 5%, the power wire was determined as pass.

In the case of the multi-core cable of Example, the reduction amount in resistance value of the power wire after the bending of 100,000 times was smaller than 5%, which means 'pass'.

(U-Shaped Bend Test)

The evaluation was performed in accordance with an automobile standard JASO C467-977.16 sensor harness bend test set by a public interest incorporated association, Society of Automotive Engineers of Japan, Inc. In the U-shaped bend test, the multi-core table was repeatedly applied with the bending from a linear shape to a U shape. After performing the bending 300,000 times at −30°, the bending was continuously performed 700,000 times at room temperature. After the test, when there was no external abnormality such as breaking and crack and the reduction amount in resistance value of the power wire from the initial resistance value was smaller than 5%, the power wire was determined as pass.

In the case of the multi-core cable of Example, even after performing the bending 300,000 times at −30° and then performing the bending 700,000 times at room temperature, there was no external abnormality and the reduction amount in resistance value was smaller than 5%, which means 'pass'.

TABLE 1

| | | | (10 wires) |
|---|---|---|---|
| power wire | first conductor | material | copper alloy wire |
| | | size | 2.5 SQ (7/72/0.08) |
| | first insulating layer | material | crosslinked flame-retardant polyethylene |
| | | size | 3.0 mm |
| twisted pair of signal wires | second conductor | material | copper alloy wire |
| | | size | 0.25 SQ (3/16/0.08) |
| | second insulating layer | material | crosslinked flame-retardant polyethylene |
| | | size | 1.4 mm |
| | twist | number of wires | 2 |
| twisted pair of electric wires | third conductor | material | copper alloy wire |
| | | size | 0.25 SQ (3/16/0.08) |
| | third insulating layer | material | crosslinked flame-retardant polyethylene |
| | | size | 1.4 mm |
| | twist | number of wires | 2 |
| second twisted pair of electric wires | fourth conductor | material | copper alloy wire |
| | | size | 0.25 SQ (3/16/0.08) |
| | fourth insulating layer | material | crosslinked flame-retardant polyethylene |
| | | size | 1.4 mm |
| | twist | number of wires | 2 |
| third twisted pair of electric wires | fifth conductor | material | copper alloy wire |
| | | size | 0.5 SQ (7/15/0.08) |
| | fifth insulating layer | material | crosslinked flame-retardant polyethylene |
| | | size | 17 mm |
| | twist | number of wires | 2 |

TABLE 1-continued

| | | (10 wires) |
|---|---|---|
| bunch wrapping tape | number of wires | 6 |
| | material | thin paper |
| inner sheath | material | crosslinked polyethelene |
| | outer diameter | 10.8 mm |
| outer sheath | material | crosslinked flame-retardant polyurethane |
| | outer diameter | 12.0 mm |

For the multi-core cables of Examples 2 to 14 of which
1. the gap ratio S3/S1 of the conductor,
2. the ratio of the outer diameter of the power wire to the outer diameter of the twisted pair of signal wires,
3. the forward or reverse directions of the stranding direction of all the wires to the twisting direction of the twisted pair of signal wires and the twisted pair of electric wires, and
4. the ratio of the stranding pitch of the power wires, the twisted pair of signal wires and the twisted pair of electric wires to the strand outer diameter of all the wires were changed with respect to the multi-core cable of six wires of the first embodiment including the power wires, the twisted pair of signal wires, the twisted pair of electric wires, which were the same as the power wires, the twisted pair of signal wires, and the twisted pair of electric wires manufactured in Example, the repeated bend test of 100,000 times, the repeated bend test of 1,000,000 times, the U-shaped bend test and the outer shape were evaluated. The results are shown in Table 2. In the multi-core cable of each example, the centers of the two power wires, the center of the twisted pair of signal wires, and the center of the twisted pair of electric wires were positioned at the apexes of the hypothetical quadrangle, and the two power wires were provided at the diagonal positions.

TABLE 2

| | Example 2 | Example 3 | Example 4 | Example 5 | Example 6 | Example 7 |
|---|---|---|---|---|---|---|
| number of wires | 6 | 6 | 6 | 6 | 6 | 6 |
| power wire | 2 | 2 | 2 | 2 | 2 | 2 |
| twisted pair of signal wires | one pair | one pair | one pair | one pair | one pair | one pair |
| twisted pair of electric wires | one pair | one pair | one pair | one pair | one pair | one pair |
| 1. gap ratio S3/S1 of conductor | 2% | 5% | 10% | 20% | 25% | 5% |
| 2. ratio of outer diameter of power wire to twisted pair of signal wires | 135% | 100% | 100% | 100% | 100% | 70% |
| 3. twisting direction of twisted pair of signal wires and twisted pair of electric wires and stranding direction of all the wires | opposite | opposite | opposite | opposite | opposite | opposite |
| 4. stranding pitch to strand outer diameter of all the wires | 20 times | 12 times | 15 times | 8 times | 20 times | 20 times |
| repeated bend test (100,000 times) | pass | pass | pass | pass | pass | pass |
| repeated bend test (1,000,000 times) | fail | pass | pass | pass | pass | pass |
| U-shaped bend test | pass | pass | pass | pass | pass | pass |
| outer shape | favorable | favorable | favorable | favorable | favorable | The shape is unstable. The roundness is not constant in |

TABLE 2-continued

|  | Example 8 | Example 9 | Example 10 | Example 11 | Example 12 | Example 13 | Example 14 |
|---|---|---|---|---|---|---|---|
| number of wires | 6 | 6 | 6 | 6 | 6 | 6 | 6 |
| power wire | 2 | 2 | 2 | 2 | 2 | 2 | 2 |
| twisted pair of signal wires | one pair | one pair | one pair | one pair | one pair | one pair | one pair |
| twisted pair of electric wires | one pair | one pair | one pair | one pair | one pair | one pair | one pair |
| 1. gap ratio S3/S1 of conductor | 5% | 5% | 5% | 5% | 5% | 5% | 5% |
| 2. ratio of outer diameter of power wire to twisted pair of signal wires | 75% | 90% | 115% | 135% | 140% | 135% | 135% |
| 3. twisting direction of twisted pair of signal wires and twisted pair of electric wires and stranding direction of all the wires | opposite | opposite | opposite | opposite | opposite | the same | opposite |
| 4. stranding pitch to strand outer diameter of all the wires | 12 times | 12 times | 12 times | 12 times | 15 times | 15 times | 25 times |
| repeated bend test (100,000 times) | pass | pass | pass | pass | pass | pass | pass |
| repeated bend test (1,000,000 times) | pass | pass | pass | pass | fail | pass | fail |
| U-shaped bend test | pass | pass | pass | pass | pass | pass | pass |
| outer shape | favorable | favorable | favorable | favorable | The shape is unstable. The roundness is not constant in the longitudinal direction. | The shape is unstable. The roundness is not constant in the longitudinal direction. | favorable |

As shown in Table 2, for all Examples, the results of the repeated bend test and the U-shaped bend test of 100,000 times were pass.

In the case of Example 2 for which the result of the repeated bend test of 1,000,000 times was fail, it is thought that the reason for this is that the gap ratio S3/S1 of the conductor is too small.

In the case of Example 12 for which the result of the repeated bend test of 1,000,000 times was fail, it is thought that the reason for this is that the power wire is too thick with respect to the twisted pair of signal wires or the twisted pair of electric wires.

In the case of Example 14 for which the result of the repeated bend test of 1,000,000 times was fail, it is thought that the reason for this is that the stranding pitch of the power wire, the twisted pair of signal wires and the twisted pair of electric wires is too large with respect to the strand outer diameter of all the wires.

In the case of Example 7 of which the roundness is not constant in the longitudinal direction, it is thought that the reason for this is that the power wire is too thin with respect to the twisted pair of signal wires or the twisted pair of electric wires.

In the case of Example 12 of which the roundness is not constant in the longitudinal direction, it is thought that the reason for this is that the power wire is too thick with respect to the twisted pair of signal wires or the twisted pair of electric wires.

In the case of Example 13 of which the roundness is not constant in the longitudinal direction, it is thought that the reason for this is that the twisting direction of the twisted pair of signal wires and the twisted pair of electric wires and the stranding direction of all the wires are the same.

In the meantime, in the case of the multi-core cables of Examples 2 to 14, even after the cables were bent 1,000,000 times, it was not observed that the wires such as the signal wires, except for the power wires, broke.

DESCRIPTION OF REFERENCE NUMERALS 1, 101: multi-core cable
10: power wire
12: first conductor
13: first insulating layer
20: twisted pair of signal wires
21: signal wire
22: second conductor
23: second insulating layer
30: twisted pair of electric wires
31: electric wire
32: third conductor
33: third insulating layer
40: sheath
41: inner sheath
42: outer sheath
50: filler
51: wrapping tape 52: shield layer
60: second twisted pair of electric wires
61: electric wire
62: fourth conductor
63: fourth insulating layer
70: third twisted pair of electric wires
71: electric wire
72: fifth conductor
73: fifth insulating layer

The invention claimed is:

1. A multi-core cable for vehicle comprising:
two power wires each of which comprises a first conductor and a first insulating layer covering the first conductor;
two signal wires each of which comprises a second conductor thinner than the first conductor and a second insulating layer covering the second conductor;
two electric wires each of which comprises a third conductor thinner than the first conductor and a third insulating layer covering the third conductor; and
a sheath covering the two power wires, the two signal wires and the two electric wires,
wherein the two power wires have a same size and are made of a same material,
wherein the two signal wires have a same size and are made of a same material, and a pair of the signal wires is twisted and is configured as a twisted pair of signal wires,
wherein the two electric wires have a same size and are made of a same material, and a pair of the electric wires is twisted and is configured as a twisted pair of electric wires,
wherein the two power wires, the twisted pair of signal wires and the twisted pair of electric wires are stranded,
wherein the two power wires are disposed with a gap therebetween, and the gap is filled with fiber, and
wherein the twisted pair of electric wires is twisted in a same direction as the twisted pair of signal wires.

2. The multi-core cable for vehicle according to claim 1, wherein an outer diameter of each power wire is 75% to 135% of an outer diameter of each twisted pair of signal wires.

3. The multi-core cable for vehicle according to claim 1, wherein on a section perpendicular to a longitudinal direction of the multi-core cable, centers of the two power wires, a center of the twisted pair of signal wires, and a center of the twisted pair of electric wires are positioned at apexes of a hypothetical quadrangle, and the two power wires are provided at diagonal positions.

4. The multi-core cable for vehicle according to claim 1, wherein the first conductor includes a plurality of conductor wires, and
wherein on a section perpendicular to a longitudinal direction of the power wire, a gap area $S3(=S1-S2)$ obtained by subtracting a total sum $S2$ of cross-sectional areas of the conductor wires from an area $S1$ of a part surrounded by the first insulating layer is 5% to 20% of the area $S1$ of the part surrounded by the first insulating layer.

5. The multi-core cable for vehicle according to claim 1, further comprising:
a second twisted pair of electric wires configured by twisting a pair of electric wires having a same size and material, each of the electric wires comprising a fourth conductor thinner than the first conductor and a fourth insulating layer covering the fourth conductor; and
a third twisted pair of electric wires configured by twisting a pair of electric wires having a same size and material, each of the electric wires comprising a fifth conductor thinner than the first conductor and a fifth insulating layer covering the fifth conductor,
wherein the two power wires, the twisted pair of signal wires, the twisted pair of electric wires, the second twisted pair of electric wires and the third twisted pair of electric wires are stranded and covered with the sheath.

6. The multi-core cable for vehicle according to claim 1, further comprising:
a wrapping tape configured to cover the two power wires, the two signal wires and the two electric wires,
wherein the wrapping tape is a paper tape, a non-woven fabric tape, or a resin tape.

7. The multi-core cable for vehicle according to claim 1, wherein a twisting pitch of the twisted pair of signal wires is set to 10 to 15 times of a twist diameter of the twisted pair of signal wires.

8. The multi-core cable for vehicle according to claim 1, wherein a twisting pitch of the twisted pair of electric wires is the same as a twisting pitch of the twisted pair of signal wires.

9. The multi-core cable for vehicle according to claim 1, wherein a stranding pitch of all the two power wires, the twisted pair of signal wires, and the twisted pair of electric wires is set to 12 to 24 times of a strand diameter of all the two power wires, the twisted pair of signal wires, and the twisted pair of electric wires.

10. The multi-core cable for vehicle according to claim 1, wherein the wrapping tape is spirally wrapped on the two power wires, the two signal wires, and the two electric wires.

11. The multi-core cable for vehicle according to claim 1, wherein a wrapping direction of the wrapping tape is opposite to a twisting direction of the twisted pair of signal wires and the twisted pair of electric wires.

* * * * *